United States Patent [19]

Resag et al.

[11] 4,390,207
[45] Jun. 28, 1983

[54] BUCKET SEAT

[75] Inventors: Jörg Resag, Plattenhardt; Walther Göldner, Ebersbach; Horst Treiber, Stuttgart-Riedenberg, all of Fed. Rep. of Germany

[73] Assignee: Recaro GmbH & Co., Fed. Rep. of Germany

[21] Appl. No.: 215,521

[22] Filed: Dec. 11, 1980

[30] Foreign Application Priority Data

Dec. 21, 1979 [DE] Fed. Rep. of Germany ....... 2951645

[51] Int. Cl.³ .............................................. A47C 1/025
[52] U.S. Cl. .................................. 297/362; 297/354; 297/379
[58] Field of Search ............... 297/379, 378, 362, 354, 297/DIG. 2, 366–368

[56] References Cited

U.S. PATENT DOCUMENTS 3,123,401  3/1964  Komenda ............................. 297/379
3,669,496  6/1972  Chisholm ........................ 297/378 X
4,178,037 12/1979  Pickles ............................ 297/379 X

FOREIGN PATENT DOCUMENTS 1282482 11/1968 Fed. Rep. of Germany .

Primary Examiner—William E. Lyddane
Attorney, Agent, or Firm—Wigman & Cohen

[57] ABSTRACT

A bucket seat for a vehicle is disclosed in which the backrest portion is hinged about an axis lying forward of the center of the seat, thus providing greater safety to passengers in the back seat and additional space for access to and egress from the back seat.

9 Claims, 5 Drawing Figures

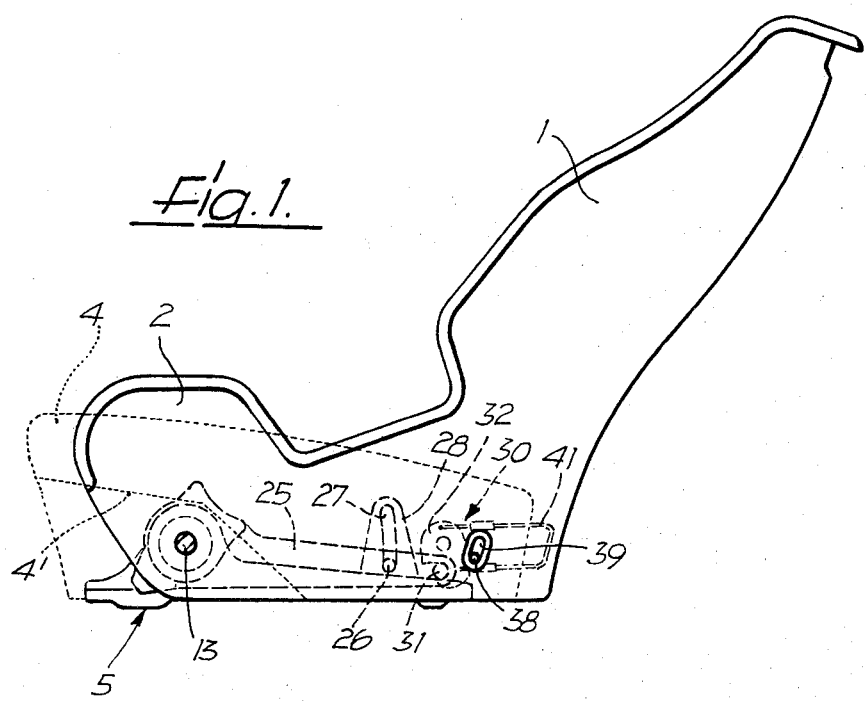
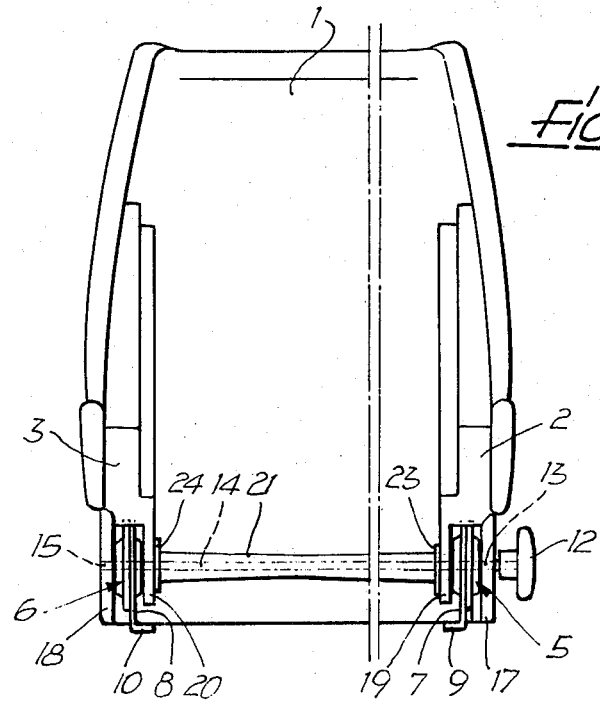

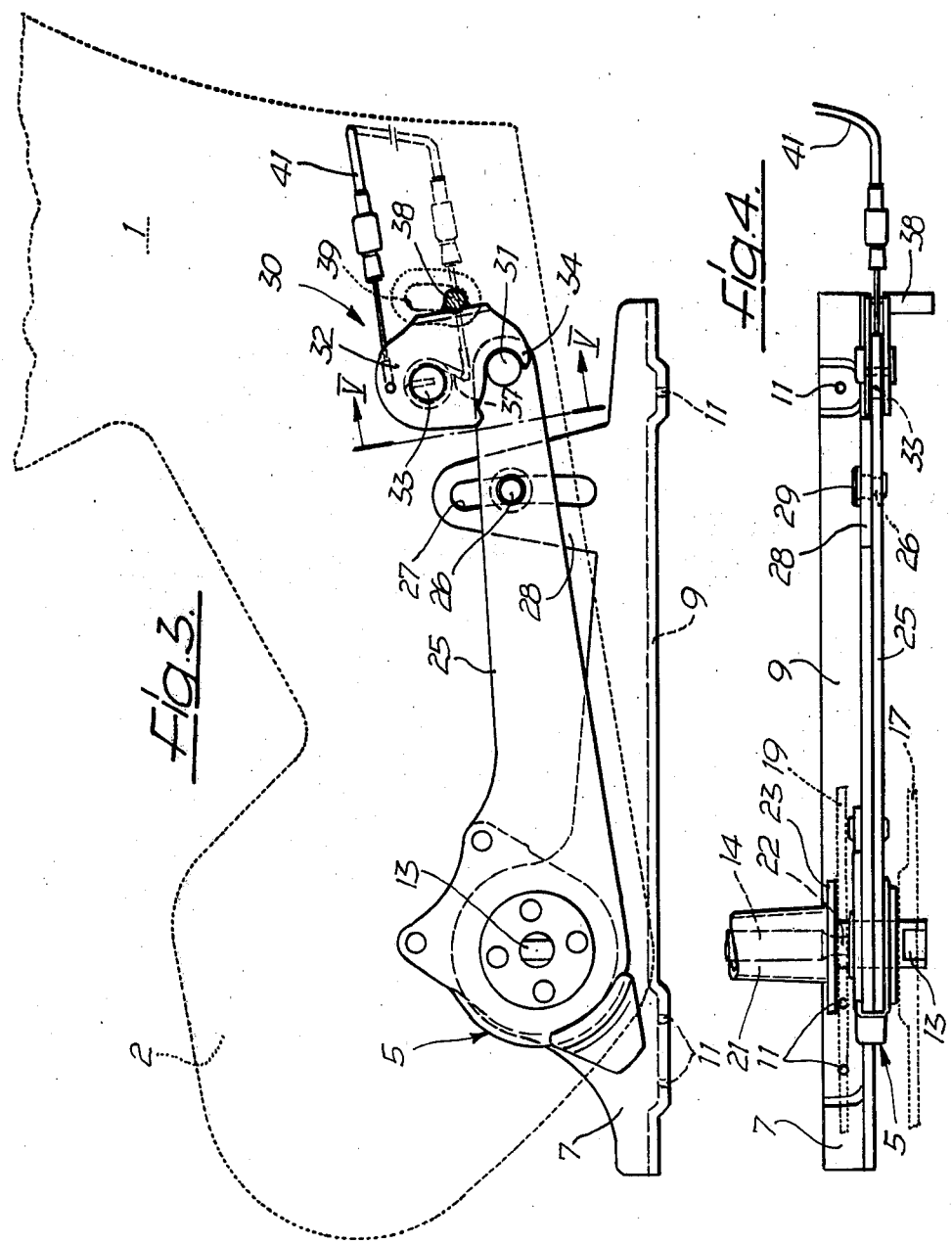

BUCKET SEAT

BACKGROUND OF THE INVENTION

The invention relates to a bucket seat, the back shell of which forms the backrest or the upholstery support thereof. The back shell is pivotable relative to the seat portion and is carried in such a manner that it can be locked in a selectable pivot position by two hinge fittings which are arranged on one or the other of the sides of the seat and are operationally connected with each other by means of a connecting shaft extending from one hinge fitting to the other.

In known bucket seats of the foregoing type, the connecting shaft lies behind the lower end portion of the backrest, because the shell, or shells, of such seats do not allow a different position of the connecting shaft. This position of the connecting shaft, however, is unsatisfactory from the standpoint of safety, because it is located in the area where the legs of vehicle guests in the back seat of the vehicle in question would impact.

OBJECT AND SUMMARY OF THE INVENTION

The object of the invention is to provide a bucket seat which is suitable for the employment of hinge fittings of the conventional type and yet satisfactorily meets the requirements of safety.

In a bucket seat of the above-described type this object is achieved according to the invention in that the hinge fittings are moved forward out of the vicinity of the rear, lower end of the back shell relative to earlier, conventional positioning, where the fittings are connected to the projecting side positions of the back shell which extend forward beyond the center of the seat portion. With this arrangement of the hinge fittings, the connecting shaft transfers the movement of the adjustment member from one hinge fitting to the other to change the angle of inclination of the back shell. The shaft extends beneath the front half of the seat surface of the seat portion, i.e., in an area where the presence of the shaft causes no difficulties with the design. Also, it is in an area where the location of the connecting shaft is the most suitable from the point of view of safety.

In a preferred exemplary embodiment, the connecting shaft is arranged beneath a section of the bottom of the upholstery support of the seat portion which is inclined upward toward the forward end of the seat.

The side portions of the back shell, at least in the area of the hinge fittings, can be formed with double walls and the hinge fittings can be disposed between the two walls of the associated side portion. This provides in an extremely advantageous manner not only a protective covering for the hinge fittings, but also, a further significant advantage since construction can proceed in a very simple manner, due to the yielding properties of the wall elements of the side portions enabling the fitting to be snapped between the side walls during assembly.

In a preferred exemplary embodiment, the respective side portions are pivotably mounted on at least one pin of the hinge fittings which pin is arranged concentrically to the pivot axis. The fitting element of both hinge fittings which support the back shell, includes an arm which extends rearwardly beyond the center of the seat portion. The back shell is detachably connected with this arm by means of a locking mechanism. By releasing this locking mechanism the back shell can be folded forward about the hinge axis of the hinge fittings. The positioning of the fittings forward of the center of the seat portion, in accordance with the invention, creates an especially large amount of free space for the access of vehicle guests to the rear seats of the vehicle in question when the backrest is folded forward. When the locking mechanism has snapped back into place after the back shell is pivoted back to its original position, the previously adjusted backrest angle remains unchanged, since the locking mechanism acts between the fitting element of each of the hinge fittings supporting the back shell and the back shell itself.

The invention is described below with the aid of an exemplary embodiment illustrated in the drawing.

BRIEF DESCRIPTION OF THE DRAWINGS

FIG. 1 is a side view of an exemplary embodiment of the bucket seat, whereby the seat portion is indicated only schematically in outline;

FIG. 2 is a front view of the back shell of the exemplary embodiment with the associated hinge fittings;

FIG. 3 is an enlarged side view of one of the hinge fittings of the exemplary embodiment with the associated locking mechanism;

FIG. 4 is a top view of the portion of the seat illustrated in FIG. 3; and

DETAILED DESCRIPTION OF THE PREFERRED EMBODIMENT

Figure 5:
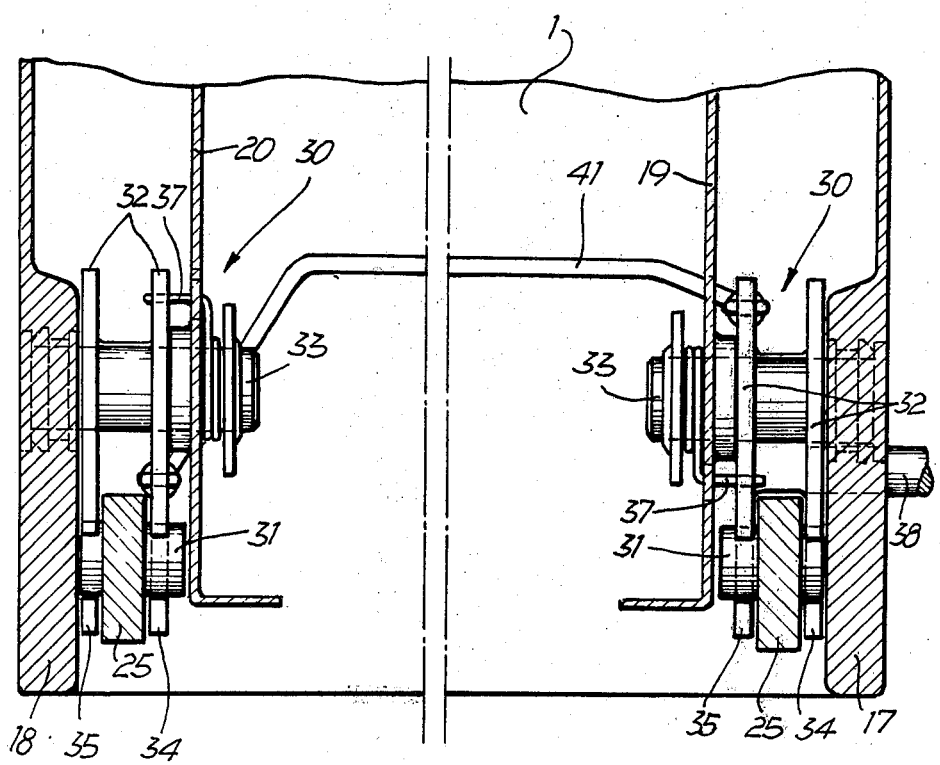
FIG. 5 is an enlarged partial section along the line V—V in FIG. 3.

A back shell 1 of the bucket seat described herein and illustrated in FIGS. 1 and 2 includes projecting side portions 2, 3 in its lower portion, between which is arranged a seat portion 4, the outline of which is schematically indicated only by a broken line, as shown in FIG. 1. The side portions 2,3 extend forward beyond the center of the seat portion 4.

To selectively adjust a desired backrest angle, the back shell 1 is connected with conventional hinge fittings 5, 6, respectively arranged on each side of the seat. These hinge fittings each include a rigidly connected fitting element 7, 8 as well as a movable fitting element 25 to adjust the backrest angle relative to the rigid fitting element 7, 8. The rigid fitting elements 7, 8, as shown particularly in FIGS. 1, 3 and 4, have the shape of a long ledge running in the longitudinal direction of the vehicle, whose lower edge 9, 10 (see FIGS. 2 through 4) is bent at an angle. These edges 9, 10 of the rigid fitting elements 7, 8 are screwed either to rails running in the longitudinal direction of the vehicle by means of threaded bores 11, as shown in FIGS. 3 and 4, for longitudinal adjustment of the bucket seat, or are screwed to a seat console.

To selectively pivot the movable fitting element 25 relative to the rigid fitting element 7, 8, these two fitting elements are connected with each other by a self-arresting planetary gear system, which is structurally united with the fitting. Fittings having this type or gearing are also known as wobble fittings. A manually activatable rotating knob 12 is provided on the side of at least one of the hinge fittings 5 and 6. This knob 12 is rigidly connected to the hinge fitting 5 on a shaft pin 13, whose rotational motion, as seen in FIGS. 2 and 4, is transferred to a corresponding shaft pin 15 (FIG. 2) of the other hinge fitting 6 by a connecting shaft 14 coupled therewith.

As may be seen particularly from FIGS. 1 and 3, the hinge fittings 5, 6 are arranged on the side portions 2, 3, respectively, in such a position that the connecting shaft 14 extends beneath the forwardly rising lower side 4' of the seat portion 4 in the front half of the seat.

The back shell 1 is provided with double walls at least in the area of its side portions 2, 3, so that the opportunity is presented of housing the hinge fittings 5, 6 in an inner chamber of the associated side portion. The chamber is formed between an outer wall 17, 18 and an inner wall 19, 20 of the side portions 2, 3. These inner and outer walls 17, 18 and 19, 20 of the side portions 2, 3 include aligned bores, through which pass the shaft pins 13, 15 of the hinge fittings 5, 6. In this manner the back shell 1 and its side portions 2,3 are pivotably mounted on the hinge fittings 5, 6, so that a pivotal movement of the back shell 1 makes it possible to adjust the backrest angle as well as to enable the backrest portion of the back shell 1 to be folded forward.

The double-walled construction of the side portions 2, 3 offers not only the advantage that the hinge fittings 5, 6 are protectively housed in the intermediate chamber between the walls 17, 19 and 18, 20, but also the additional advantage that the installation of the hinge fittings 5, 6 can be performed simply and comfortably. The resiliency of the side elements of the side portions 2, 3 is sufficiently large enough to allow the hinge fittings 5, 6 to snap into the intermediate chambers with a slight spreading apart of the walls 17, 19 and 18, 20. Only when this is completed is the connecting shaft 14 set in place. The connecting shaft 14 has nonround carrier ends 22 on both sides (FIG. 4), which can be inserted into complementary shaped openings in the shaft pins 13, 15 of the hinge fittings 5, 6. The insertion also takes place while utilizing the resiliency of the portions of the side portions 2, 3, in that the walls 19, 20 are slightly spread outward. The connecting shaft 14 is located in the hollow chamber of a torsion spacing tube 21. After the carrier ends 22 have been inserted into the shaft pins 13, 15, the walls 19, 20 are no longer spread outward. The walls 19, 20 lie against end flanges 23, 24 of the torsion spacing tube 21 and can be rigidly connected therewith, as for example, by welding. After this connection is made, the result is a distortion-resistant shell construction which is no longer resilient.

The movable fitting element 25 of both hinge fittings 5, 6, which element 25 supports the back shell 1, is formed as an arm on each hinge fitting 5, 6. The movable fitting element or arm 25 is pivotable and is dependent on the rotation of the rotatable knob 12—and therewith the shaft pins 13 and 14—about the hinge axis defined thereby. As may be seen particularly in FIGS. 1 and 3, the arm 25 of each hinge fitting 5, 6 extends beyond the center of the seat portion 4 toward the rear. FIGS. 3 and 4 show that the arm 25 carries a riveted guide bolt 26 near its rear end, which bolt 26 is guided in an arcuate slot 27 formed in an upwardly projecting extension 28 of the rigidly arranged fitting elements 7, 8. This extension 28 extends between a broadened head element 29 of the guide bolt 26 and the opposite side surface of the arm 25. The ends of the arcuate guide slot 27 simultaneously serve to limit the pivotal range of the associated arm 25 and thereby to limit the adjustment range for the backrest angle of the back shell 1. FIG. 3 shows the arm 25 in an adjusted position which is raised relative to FIG. 1.

The arm 25 in each hinge fitting 5, 6 is detachably connected at its rear end with the back shell 1 by means of a locking mechanism, designated generally in FIG. 3 by reference numeral 30. When the arm 25 of each hinge fitting 5, 6 is brought out of engagement with the back shell 1 by releasing the locking mechanism 30, the back shell 1 can then be pivoted forward about the hinge axis. When the back shell 1 is then pivoted back and the locking connection between the arm 25 of each hinge fitting 5, 6 and the back shell 1 is re-established, the backrest will assume the same angular adjustment position as it had before because of the selected adjustment position of the arm 25.

The construction of the locking mechanism 30 is seen most clearly in FIGS. 3 through 5.

The locking mechanism 30 which connects the arm 25 of each hinge fitting 5, 6 with the back shell 1 has a bolt 31 on each arm 25 which serves as a lock member. The longitudinal axis of this bolt 31 lies parallel to the hinge axis and the bolt 31 is located at the end of its associated arm 25, projecting beyond the side surface thereof on both sides, as best seen in FIG. 5. On each side of the back shell 1 in the intermediate chamber between its side walls 17, 19 and 18, 20, there is provided a latch 32 which cooperates with the bolt 31 and which is pivotably mounted on a shaft 33. Two shafts 33 are aligned with each other and run parallel to the longitudinal axis of two bolts 31. Each latch 32 includes two hook-shaped pawls 34, 35 which are spaced from each other and lie parallel to the plane of the arm 25. When the locking mechanism 30 is in its locked position, these pawls 34, 35 enclose between them their associated arm 25, and hook behind the bolt 31 serving as a lock member, as is shown in FIGS. 3 and 5. Springs 37 disposed on each shaft 33 normally bias the latch 32 into the pivot engaging the bolt 31, as shown in FIGS. 3 and 5.

In order to rotate the latch 32 out of the shown engaged position against the spring force of the springs 37 and into the free position, where the pawls 34, 35 are not engaged with the bolts 31 so that the back shell 1 can be freely pivoted forward, an activating lever 38 extends outward through a slot-like opening 39 in the adjacent outer wall 17 of the back shell 1 so that it can be manually grasped. In order to transfer the rotational motion of one latch 32 to the other latch 32 on the other side of the seat, a Bowden cable 41 is connected to the upper side of the latch 32 shown on the right side in FIG. 5 and is guided to the area of the back side in FIG. 5. The Bowden cable 41 is then guided to the area of the back side of the back shell 1, where it runs along the back side of the back shell 1 to the other side of the seat and is there connected to the latch 32 shown at the left in FIG. 5, the connection being beneath the shaft 33 of the latch 32. The points of connection of the Bowden cable 41 are thus diametrically opposite each other in the two latches 32 with regard to their pivot shafts 33. This means that, when the latch 32 shown in FIG. 3 is rotated by raising the activating lever 38, the Bowden cable 41 connected to the upper side of this latch 32 is drawn outward. This causes the other latch 32, shown at the left in FIG. 4, to be drawn backward, because the Bowden cable 41 is connected below its pivot shaft 33. This means that the latch 32 and shown at the left in FIG. 5, follows the rotational motion of the latch 32 shown at the right into the release position. If the activating lever 38 is then released, both latches 32 return into their normal engaged position.

Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. Bucket seat comprising:
   a seat portion,
   a back shell forming a backrest,
   two hinge fittings supporting the back shell so as to be pivotable relative to the seat portion and being capable of locking in a selectable pivot position, said hinge fittings being arranged on the respective sides of the seat portion, and
   a connecting shaft operationally connecting and extending from one hinge fitting to the other, said connecting shaft being positioned beneath the front half of the seat portion and being the pivot axis about which the back shell is pivotable for adjusting only the inclination of the backrest without adjusting the seat portion.

2. Bucket seat according to claim 1, wherein said connecting shaft is arranged beneath a section of the bottom of the seat portion which is inclined upwardly toward the front.

3. Bucket seat according to claim 1 or 2, wherein the back shell includes side portions formed with double walls at least in the area of the hinge fittings, said hinge fittings being inserted between the double walls of the associated side portions.

4. Bucket seat according to claim 3, wherein said side portions are pivotably mounted on at least one shaft pin of said hinge fitting and said at least one shaft pin is arranged concentrically with the connecting shaft which acts as the pivot axis, and further comprising arms extending rearwardly from each hinge fitting and which are detachably connected with the back shell by a locking mechanism on each side portion thereof.

5. Bucket seat according to claim 4, further comprising stationary guide means, spaced from the hinge axis, for guiding said arms from their sides and for limiting their pivot range.

6. Bucket seat according to claim 3, wherein said locking mechanism includes a hook-like latch which is pivotably mounted on the back shell and a lock member engagable by said hook-like latch and arranged on a free end portion of each arm.

7. Bucket seat according to claim 6, wherein said lock member is a bolt which projects from each arm on both sides and lies parallel to the pivot axis, and wherein said hook-like latch includes two spaced pawls which enclose the arm therebetween.

8. Bucket seat according to claim 7, wherein said hook-like latch includes a pair of latches having aligned axes and being mounted on one or the other side of the side portions of the back shell.

9. Bucket seat according to claim 8, further comprising a Bowden cable guided from the locking mechanism on one side portion to the locking mechanism on the other side portion of the back shell, said Bowden cable being connected to diametrically opposite points of the pair of latches with respect to the pivot axis of the pair of latches in order to transfer the rotational movement of one latch to the other, and further comprising at least one activating lever which acts to pivot its associated latch.

* * * * *